Feb. 20, 1973 V. R. ZOPF ET AL 3,717,206
SCRAMBLED TELEVISION
Filed Nov. 2, 1970
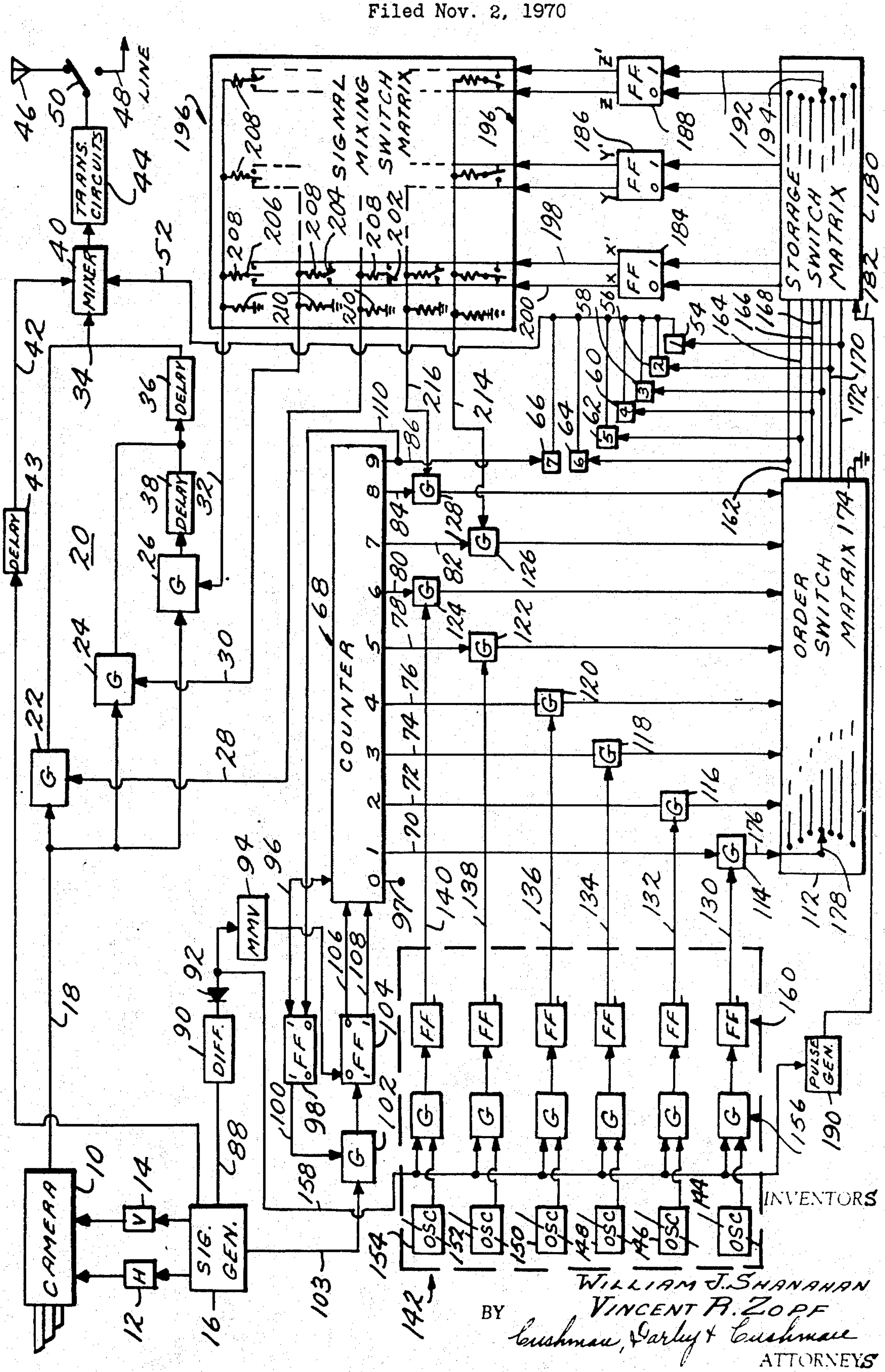
INVENTORS
WILLIAM J. SHANAHAN
VINCENT R. ZOPF
BY Cushman, Darby & Cushman
ATTORNEYS 3,717,206
SCRAMBLED TELEVISION
Vincent R. Zopf, Commack, and William J. Shanahan, Northport, N.Y., assignors to Skiatron Electronics & Television Corporation, New York, N.Y.
Filed Nov. 2, 1970, Ser. No. 85,917
Int. Cl. H04n *1/44*
U.S. Cl. 175—5.1 19 Claims

ABSTRACT OF THE DISCLOSURE

A television scrambling system in which the video and synchronizing signals are time shifted on a randomly coded basis. The code is partially generated by periodically occurring counter signals being randomly gated to an order switch matrix which is manually changeable to any of numerous available orders for different programs of the randomly gated counter signals, and the ordered signals are applied both to a set of tone generators and a storage switch matrix. The resulting tones are transmitted to convey an unscrambling code to receivers, while the signals in the storage switch matrix are manually changed for different programs to cause different sets of flip-flop output signals which are then mixed by another switch matrix and applied to different video signal delay lines for gating same for transmission.

This invention relates to scrambled television which may be used in a subscription television system.

More particularly, it relates to, and has for its main object, the provision in a scrambled television system, which otherwise includes signal translating means operative in response to alternately applied actuating signals to change the video signals, for example, to any one of a plurality of different modes, of novel apparatus for generating those actuating signals. The equipment also may include apparatus by which a plurality of individual signals may be generated, with each such signal having a different predetermined identifying characteristic and representing a code different than that for the actuating signals, for transmission to receivers in the system whereby decoding may be effected.

Still other objects of this invention will become apparent to those of ordinary skill in the art by reference to the following detailed description of the exemplary embodiment of the apparatus and the appended claims. The various features of the exemplary embodiment according to the invention may be best understood with reference to the accompanying drawing.

Camera 10, as illustrated in the drawing, may be operated in conventional manner by horizontal and vertical sweep circuits 12 and 14 driven by signals emanating from signal generator 16. Although the invention herein may be applied to varying the time relationship between synchronizing signals and video signals by time shifting the synchronizing signals, it is preferably applied to the time shifting of the video signals themselves while the synchronizing signals recur in a normal steady phase relationship with each other. That is, the video signals on line 18 from the camera may be applied through the signal translating means 20 to effect different operating modes from time to time in the television system. For example, the system may be operated in three different modes as by mutually exclusively opening gates 22, 24, 26 by enabling signals which appear alternately on the respective gating lines 28, 30, 32, i.e., as will be later more fully explained, the enabling signals on these lines are caused to occur randomly but mutually exclusively so that only one of the gates is enabled at a time. Therefore, when gate 22 is enabled, the video signals on line 18 will pass to junction 34 instantly. However, when either of gates 24, 26 is enabled, the video signals then on line 18 will pass to junction 34 with, respectively, a relatively small amount of delay as effected by delay line or unit 36, or with a greater amount of delay as effected by delay line or unit 36 in combination with delay line 38. Then, the video signals to mixer 40 will appear, relative to the composite synchronizing signals delivered thereto on line 42 via delay line 43, with no delay, a first amount of delay, or a greater second amount of delay, providing the three different modes hereinabove mentioned. The output of mixer 40 may be applied to conventional transmitting circuits 44 for radiation via antenna 46 or for transmission over line 48 as in a closed circuit system, according to the setting of switch 50.

In order that any scrambled television transmission system can be effectively unscrambled or decoded at each receiver in the system, it is desirable to provide to the receivers signals which emanate from the transmitter and which represent in one manner or another at least part of the encoding information. In the instant case, the signals which partially represent the encoding information as itself fully represented by the actuating signals on lines 28, 30, 32, are present on line 52, and these may be separately transmitted by radiation or a land line to the receivers, or as illustrated mixed with the video signals in mixer 40. The signals which occur on line 52 are preferably individual signals each with a different predetermined characteristic, such as frequency, though other characteristics like amplitude, etc., may be employed. In the particular embodiment illustrated, these signals are serially produced in generators such as gated oscillators 54, 56, 58, 60, 62, 64 and 66 at different frequencies $f_1$–$f_7$. These different frequency signals, when they occur during any given mode determining or retrace interval of the system, are preferably mixed with the video signals in such a way that each different frequency signal occurs between a different set of adjacent post-horizontal synchronizing signals in a vertical retrace period. These different frequency signals or "frequency bursts" are each of a relatively high frequency so that several detectable cycles thereof can occur between adjacent post-horizontal synchronizing signals. Such frequency bursts are at times referred to as "tones" even though their frequency is beyond the audible frequency range.

The overall transmitter in the drawing is preferably supplemented with a gray level and video inversion system. In such a case, the blanking signal and picture signals are amplitude inverted (blanking and black level signals changed to white level signals and vice versa) and the synchronizing signals on line 42 would then have an amplitude larger than normal so that they extend from about a 15% modulation amplitude level to their normal 100% modulation amplitude level. The above referred to tones as inserted between certain horizontal synchonizing signals have a similar amplitude as those synchronizing signals, and consequently extend through the picture signal amplitude range. For this invention, however, the picture and blanking signals need not be amplitude inverted, and when not, the tones preferably do not extend into the picture signal amplitude range. The particular manner in which the tones or frequency bursts are gated on and off at the correct time, and by which their occurrence and order is coded, is now described.

To effect the proper timing so that any given frequency will occur between two post-horizontal synchronizing signals, counter 68 with a plurality of output lines 70, 72, 74, 76, 78, 80, 82, 84, 86 may be employed. Any type of counter with any desired number of outputs may be used, but it is presently preferable that counter 68 be a beam switching tube of the magnetron family, for example a "Haydu" decade counter sometimes referred to as a "Trochotron." Such a counter, as is will known, has a common cathode around which is disposed a plurality of anode-like elements called targets, there being associated with each target two electrodes conventionally referred to as a grid and a spade. In addition, such a tube has a magnet surrounding the targets, which tends to make an electron beam, once established between the cathode and a target, step to the next adjacent target always in a given direction, for example clockwise. Controlling the voltage on the grid and spade electrodes, controls the stepping of the counter.

The circuitry in the drawing is illustrated with such a counter in mind, although other counters may as well be employed. To effect resetting of the counter once each vertical retrace interval, near the beginning thereof, the conventional vertical drive signal as present on line 88 from signal generator 16 in the form of a negative pulse, is differentiated in circuit 90 with diode 92 selecting the negative-going differential pulse. Monostable multivibrator 94 is thereby effectively triggered to its unstable state by the leading edge of each vertical drive pulse on line 88. In turn, the leading edge of the resulting square wave output of multivibrator 94 is coupled via line 96 to the 0 spade in counter 68 for causing the initial formation of a beam between the cathode and 0 target and for re-forming the beam therebetween at the beginning of each successive retrace interval if for some reason it has ceased. When the beam is on the 0 target, the counter is reset and a signal appears on its unused 0 output line 97.

Flip-flop 104 is also reset to a given state, for example 0, by the leading edge of the multivibrator 94 output. A signal is thereby provided from the flip-flop, say via line 106, but that signal is coupled to the 0 grid so that counter does not stop in response thereto. At the end of a predetermined time determined by the time constants within multivibrator 94, that multivibrator returns to its stable condition effecting a trailing edge to its square wave output. As applied to one input of a flip-flop 98, that trailing edge causes the flip-flop output on line 100 to enable gate 102. The next horizontal synchronizing pulse (or drive pulse if desired) then on line 103, passes through gate 102 to trigger flip-flop 104 to its non-reset state, causing a signal on its other output line 108 which is connected to the 1 grid of the counter. A negative-going square wave is consequently effected on counter output line 70. Successive gated horizontal pulses then cause the flip-flop output voltages on lines 106 and 108 to alternate between relatively high and relatively low values in a well known manner. Line 106 is coupled, preferably through a differentiator negative-pulse clipper not shown, to each of alternate (even numbered) grids in the counter, while line 108 is similarly coupled to the remaining grids therein. The voltage alternation on these lines then causes counter 68 to produce successive output signals on line 70 through 86.

Since it is desired to cause the frequency bursts from generators 54–66 to occur between the horizontal pulses which follow the post-equalizing pulses, which in turn follow the vertical synchronization signal in any vertical retrace period, the predetermined amount of delay effected by monostable multivibrator 94 is such as to open gate 102 at a time following, preferably just following, the last one of the post-equalizing pulses. Each input signal to counter 68 from flip-flop 104 causes a negative square wave pulse to begin on one of the counter output lines and simultaneously causes the previously existing pulse on the next preceding counter output line to end. The counter is internally arranged for ring type operation so when the tenth gated horizontal pulse is applied via flip-flop 104 the resultant signal on line 106 causes the beam to be transferred from the 9 target back to the 0 target. This removes the negative square wave from counter output line 86 causing a positive-going trailing edge which is conveyed by line 110 back to the other input of flip-flop 98, for effecting therefrom a signal on line 100 which disables gate 102. The counter having counted ten gated horizontal pulses, then is prevented from counting until the occurrence of the next vertical retrace period. The step functioning of the counter in each vertical retrace interval is ended preferably before the following vertical trace interval begins by virtue of the delay in multivibrator 84 being preset such as to allow the counting to start at a time when at least ten post-horizontal pulses remain in a vertical retrace interval.

Each of the counter output lines, except the last output line 86, are coupled to different inputs of a switching matrix 112 by respective gates 114, 116, 118, 120, 122, 124, 126 and 128. Gates 114 through 124 may be randomly operated by virtue of the randomly occurring enabling signals on the respective input lines 130 132, 134, 136, 138, 140. Each of these input or enabling lines is the output line of a respective individual random signal generator each of which is a part of the overall random signal generator 142. There may be six individual signal generators in the overall generator 142 as illustrated, and each includes its own oscillator 144, 146, 148, 150, 152, 154 each of which may be a free-running multivibrator for example. These oscillators are preferably tuned to operate at different frequencies, and further, each is preferably variable in frequency so that the instant relative amplitudes of the oscillator outputs may be controlled. The output of each oscillator is applied through a respective gate 156 when those gates are otherwise enabled in common for an instant by the differentiated negative vertical drive signal on line 158. Therefore, during each vertical retrace period, the outputs of all of the oscillators 144–154 are simultaneously sampled, and any one which has during the sampling instant an output amplitude sufficient to pass through the otherwise enabled gate 156 and trigger the respective flip-flop 160 to its opposite stable state, does so regardless of which state that flip-flop was previously in. As indicated, only one of the two output lines available from each of flip-flop 160, is connected to gates 114–124. Therefore, each time one of the flip-flops 160 receives a sufficient input signal from its respective gate 156, that flip-flop will "toggle" and change its output signal level from a relatively high value to a relative low value, or vice versa, for enabling or disabling the associated counter output gate.

Switch matrix 112 receives an output signal from each of gates 114–128, when same are enabled, and internally is such as to allow connection of any received counter output signal to any one of seven different matrix output lines 162, 164, 166, 168, 170, 172, or 174. That is, each of the input lines to matrix 112 is connected to a switch arm which in turn is connectable to any one of the seven different output lines from the matrix. For example, input line 176 is coupled to switch arm 178, which in turn is connectable internally of the matrix to any one of seven different terminals respectively connected to the seven different matrix output lines. The signals which occur on the matrix output lines 162–172 are coded signals which represent a code pattern according to their order of occurrence and random existence. That is, neglecting for the moment any output from gates 126 and 128, since the output signals on counter output lines 70–80 are randomly selected via the respective gates 114–124, the input signals to matrix 112 from those gates during any vertical retrace period exist in a random sense. Furthermore, any input signal which does actually exist on a matrix input line may not exist on one of the matrix output lines 162–172 due to coding which can be effected by connection of any one or more of the matrix input lines to be grounded output line 174. For example, when switch arm 178 is in contact with its lowermost terminal, any output from gate 114 is passed to ground, and not to any one of the ouptut lines 162–172. Also, the switch settings in matrix 112 determine the order in which any signals on lines 162–172 occur, and this order may be different than the order of the associated output signals from counter 68 as respectively passed, if at all, by gates 114–124 as matrix 112 input signals.

The matrix output lines 162–172 are respectively coupled to generators 64–54 so that the coded signals from the matrix 112 may be employed for gating the frequency generators on and off. Each output signal from counter 68 is of a duration equal to the time between corresponding leading edges of, rather than just between, successive horizontal synchronizing pulses. Therefore, a frequency burst from any of generators 54–66 as inserted in the video envelope by mixer 40 may actually ride atop its corresponding horizontal synchronizing pulse for the duration of that pulse and otherwise be of greater amplitude than the synchronizing pulses, but this is immaterial since mixer 40 and/or the transmitting circuits 44, as desired, clip off the excess amplitude of the burst. Delay 43 is preferably employed to provide assurance that a front (as well as a back) porch is always present for each horizontal synchronizing pulse relative to its respective blanking pulse even though the latter may be shifted timewise in translator 20. The presence of delay 43 must be taken into account in the design so that no frequency burst in the envelope begins before its corresponding horizontal synchronizing pulse. This may be done in any suitable manner desired.

For use by some types of receiver decoders, for example as in the copending Shanahan et al. application Ser. No. 86,115 filed even date herewith, it is desirable to transmit at least one burst of given frequency during each vertical retrace interval. Since it is possible with the system so far described to have no gating signal present on any of matrix output lines 162–172 during any given vertical retrace period, there is provided a frequency burst generator 66 which is gated on during each vertical retrace period by the last output signal from counter 68 as it occurs on output line 86. Therefore, during each vertical retrace period, there will be at least a single burst with a frequency $f_7$ different from the frequency output of any of the other generators 54–64, and this frequency burst will always be the last, if not the only, burst of frequency during any vertical retrace period.

As mentioned in the above copending application, the burst from generator 66 may be employed at a decoder for several purposes among which is the generation of a pulse at the beginning of a mode determining interval next following the mode determining interval in which the burst occurred, for resetting flip-flops when desired before further controlling those flip-flops by whatever frequency bursts occur thereafter. To cause such a pulse to always occur in a decoder during a retrace interval before other bursts are detected in that interval, the burst producing that pulse need not be sent from the transmitter as the last burst every vertical retrace interval, but should occur invariably at a given time during each such interval. Consequently, generator 66 may be gated on by any of the other counter outputs on lines 70–84, as long as that output is not otherwise used, if timing constants at the decoder are appropriately set. In cases where it is not necessary to have a given burst of frequency always occur last, or at another given time, or even at all, the last counter output signal may be gated randomly as are the signals on lines 70–80, or in the manner to be described for the signals on lines 82 and 84, and then fed directly to generator 66 or as in input signal to matrix 112.

It will be appreciated from the foregoing that the coded signals on lines 162–172 and from generators 54–66 are developed during what may be termed a "mode determining interval" which in the example set forth may be thought of as corresponding to a vertical retrace interval, though any other usable interval may be employed, and in any event a mode determining interval need not be coextensive with a vertical retrace interval.

To obtain actuating signals for lines 28, 30 and 32, whereby the video signal translating gates 22, 24, 26 may be randomly mutually exclusively operated, signals representing a first code pattern as effected by the circuitry above described, are developed into a second code which is different than the first code. That is, the coded signals either as detected from generators 54–65, or as present on matrix output lines 162–172, represent a first code and can be coupled as inputs to a second switching matrix 180, preferably along with another signal on line 182 if desired, with the outputs from matrix 180 as therein coded being applied to the inputs of three different flip-flops 184, 186, 188. The additional signal on line 182 may be developed in pulse generator 190 in response to each vertical drive signal as differentiated and clipped by diode 92. Pulse generator 190, which may be for example a monostable multivibrator, shapes and times the pulse to correspond at least approximately to any other input pulse to switch matrix 180. Alternatively, the input on line 182 may be derived from multivibrator 94 or from any other point in the circuit which will provide for generation of a pulse on line 182 before, in any given vertical retrace interval, any gated counter output pulse is applied via one of lines 162–172 to matrix 180.

Each of the six output lines of matrix 180, of which there are two for each of the flip-flops 184–188, may be connected to any one of the different matrix 180 input lines, seven such input lines being illustrated. For example, flip-flop input line 192 is connected to switch arm 194 which in turn is connectable to any one of the seven different input lines to matrix 180. In this manner, the respective switch settings in matrix 180 predetermine which side of which flip-flop stores any signal received by that matrix, thereby giving to the flip-flops 184–188 a coded output signal combination at all times. Since the pulse on line 182 occurs before any pulse on lines 162–172, it may be employed as desired by appropriate switch settings in matrix 180 to preset (not necessarily "reset") any one or more of the flip-flops to a given state. Though not shown, flip-flops 184, 185, 188 may each have a third input line from matrix 180 for toggling purposes if desired.

To further develop the actuating signals for the signal translating apparatus 20, both output signals of each flip-flop 184, 186, 188 are coupled to lines 28, 30, 32, via a switching matrix 196. This matrix may be of the diode mixing type, but preferably is of the resistor mixing variety as illustrated and which is similar to that described in U.S. Pats. Nos. 3,274,333 and 3,538,243 to Shanahan et al. and assigned to the assignee hereof. That is, preferably for any output line from matrix 196, the signal thereon is proportional to the average of the instant output levels of the flip-flops to which that output line is connected. Both output lines from each flip-flop extend (upwardly in the illustration) through the matrix 196, and any one matrix output line is connectable by way of a switch to one or the other of the output lines of each pair thereof from the three flip-flops. For example, the pair of output lines 198, 200 from flip-flop 184 extend vertically in the matrix, and each of the matrix output lines 28, 30, 32 is connectable to either of those flip-flop output lines by a respective switch 202, 204, 206 via a respective resistor 208 in addition to being similarly connectable (as exemplarily shown for matrix output line 32 as it extends horizontally to the right in the matrix) to either line of the other output line pairs from flip-flops 186 and 188. The voltages on the flip-flop output lines, which are coupled in common to a matrix output line by the instant setting of the associated matrix switches, one mixed together by the resistors that effect the coupling between the respective switches and matrix output lines, for example the upper three resistors 208, and develop across the respective output resistors 210 a signal which is proportional to the average of the so connected flip-flop outputs. Each of the switches within matrix 196 may be a three position switch with an "off" center position, whereby a large number of variable level matrix output signals may be obtained.

During any given vertical trace time, there must be one and only one of the signals on lines 28, 30, 32 which is of the proper amplitude to enable the respective one of gates 22, 24, 26, so that at no such time will the video signals on line 18 not appear at terminal 34 nor appear there more than once as via two of the gates. One way of assuring this is to couple to output line 28 only the output of one flip-flop, while coupling to output line 30 the complement of that output and the output of another flip-flop, with output line 32 being coupled to receive the complements of both those outputs. That is, if the left side outputs from flip-flops 184, 186, 188 are designated X, Y, Z respectively and their right side complements are designated X', Y', Z', then there will always be an enabling signal present on only one of the matrix output lines 28, 30, 32, regardless of the relative instant states of the flip-flops, if, for example, line 28 is connected by switch 202 as shown to the X output, line 30 is connected to the X' and Y outputs, and line 32 is connected to the X' and Y' outputs. It will be noted that neither the Z nor Z' output is employed in this instance. However, with a different setting of the matrix switches they can be employed while both outputs from another flip-flop are not used.

If the matrix output signals to gates 22, 24, 26 are designated $G_1$, $G_2$, $G_3$, Table I below shows the twelve different flip-flop output combinations which may be employed to invariably cause an enabling signal to one and only one of those gates.

TABLE I

| $G_1$ | $G_2$ | $G_3$ |
|---|---|---|
| X | X'Y | X'Y' |
| X | X'Z | X'Z' |
| X' | XY | XY' |
| X' | XZ | XZ' |
| Y | Y'X | Y'X' |
| Y | Y'Z | Y'Z' |
| Y' | YX | YX' |
| Y' | YZ | YZ' |
| Z | Z'X | Z'X' |
| Z | Z'Y | Z'Y' |
| Z' | ZX | ZX' |
| Z' | ZX | ZY' |

Since the $G_1$, $G_2$, $G_3$ signals need not be coupled to gates 22, 24, 26 respectively, but can be coupled thereto in any desired manner (for example, $G_2$ to gate 22, $G_1$ to gate 24, $G_3$ to gate 26), there are factorial three or six different coupling arrangements available by virtue of the switches in matrix 196. For each different coupling arrangement there are 12 ways (like in Table I) to cause the gating signals, so there exists 72 different available switching combinations which will invariably effect one and only one of the gates to be unabled at a time. This is true whether the gates are designed to be enabled in response to the highest or lowest voltage delivered by a matrix output line. For example, and neglecting any resistance drops, if all the flip-flop outputs are each either 30 or 70 volts according to the flip-flop states, then if $G_1$ is 30 volts, $G_2$ will be 50 volts (the average of 70 and 30) if $G_3$ is 70 volts (the average of 70 and 70), or else $G_2$ will be 70 volts when $G_3$ is 50 volts; similarly, if $G_1$ is 70 volts, $G_2$ will be 50 volts while $G_3$ is 30 volts or vice versa. Under any of these four voltage combination conditions, which are all that can occur when the matrix switches are set in accordance with Table I, one only of the gating signals is at its lowest voltage level while another one only is concurrently at its highest voltage level. Consequently, gates 22, 24, 26 may all be responsive to either, but not both, the lowest level only, or the highest level only, of their respective gating signals.

Another way of assuring that one and only one of gates 22, 24, 26 is always enabled involves coupling two flip-flop outputs to each of the gates and otherwise sensing the flip-flop output combinations to determine if the instant combination is an "invalid" one which will cause no one of the gating signals to be at its highest level (or lowest level); if so then the state of at least one of the flip-flops is changed so that their output combination is a valid one. Table II may be advantageously employed to understand a situation of this sort.

TABLE II

| | $G_1$ | $G_2$ | $G_3$ | $G_4$ | $G_5$ |
|---|---|---|---|---|---|
| FF outputs | XY | X'Z | Y'Z' | XY'Z | X'YZ' |
| Operating condition: | | | | | |
| 1 | 70 | 50 | 30 | 57 | 43 |
| 2 | 70 | 30 | 50 | 43 | 57 |
| 3 | 50 | 50 | 50 | 70 | 30 |
| 4 | 50 | 30 | 70 | 57 | 43 |
| 5 | 50 | 70 | 30 | 43 | 57 |
| 6 | 50 | 50 | 50 | 30 | 70 |
| 7 | 30 | 70 | 50 | 57 | 43 |
| 8 | 30 | 50 | 70 | 43 | 57 |

In Table II, the gating signals $G_1$, $G_2$, $G_3$ are again those signals which occur on lines 28, 30, 32, respectively or as otherwise desired, due to the averaging of the instant values of a pair of different flip-flop outputs. The $G_4$ and $G_5$ signals are those which occur on matrix output lines 214 and 216 when those lines are coupled to the flip-flop outputs as indicated. Either line 214, 216 may carry the $G_4$ or $G_5$ signal with the other such line carrying the remaining signal.

When the relative states of the flip-flops 184, 186, 188 are such as to cause the operating condition designated No. 1 in Table II, of the three gating signals $G_1$, $G_2$, $G_3$, $G_1$ is at its highest voltage level (70 volts, still using the 30 or 70 volt convention as the two possibilities for any flip-flop output and neglecting any loss due to voltage averaging) while $G_2$ is at a mid level and $G_3$ is at its lowest level. At the same time, $G_4$ and $G_5$ are at mid levels, so gates 126 and 128 are not enabled thereby. A similar situation exists for operating condition No. 2, except the $G_2$ and $G_3$ levels are interchanged. However, for operating condition No. 3, none of the $G_1$, $G_2$, $G_3$ signals is at either its highest or lowest level. This condition is intolerable since if it were allowed to persist, no one of gates 22, 24, 26 would then be enabled during the ensuring vertical trace interval. Correction of the condition is accomplished before that trace interval begins, however, by employing the $G_4$ signal which by virtue of being the average (in Table II) of the X, Y', and Z flip-flop outputs is at its highest level only during operating condition No. 3. Whichever one of gates 126, 128 that receives the $G_4$ signal, say gate 126, is then enabled to pass the pulse applied thereto by counter 68.

As will be recalled, all three of the flip-flops are set to their coded operating conditions by output signals from matrix 180 at least by the time the pulse on counter output line 80 is about to be ended. Therefore, if the intolerable or invalid flip-flop operating condition No. 3 in Table II then exists, gate 126 is enabled by signal $G_4$ in time to gate the following counter pulse when it occurs on line 82.

The output of gate 126 is routed through the order switch matrix 112 to one of its output lines 162–172. This accomplishes two functions simultaneously: the pulse gates on one of the frequency burst generators 54–64 and also triggers either or both inputs of one or more of the flip-flops 184, 186, 188 according to how the switches are set in matrix 180. In response thereto the flip-flops change from operating condition No. 3 to another of their eight possible operating conditions. For example, if the output of gate 126 is routed through matrices 112 and 180 so as to be coupled only to flip-flop input line 192, then Z' changes from 30 to 70 volts while Z does the reverse; flip-flops 184 and 186, however, do not change states. Consequently, operating condition No. 4 is put into effect. In this condition, one and only one of the $G_1$, $G_2$, $G_3$ signals ($G_3$) is at its highest voltage level so the video signals on line 18 thereafter and at least until the next vertical retrace interval are passed by whichever of gates 22, 24, 26 receives the $G_3$ signal.

By reference to Table II again, one can appreciate that there is no similar problem existing when the flip-flops are operating either in conditions 5, 7, or 8. On the other hand, when in operating condition No. 6, again none of the three gating signals $G_1$, $G_2$, $G_3$ is at its highest or lowest level. To correct the intolerable condition this time, signal $G_5$ is employed. By virtue of that signal being the result of the average of the X', Y, and Z' flip-flop outputs, it is at its highest level only during operating condition No. 6. Gate 128 may then be enabled thereby to pass the counter output pulse when it occurs on line 84 through matrices 112 and 180 to one or more of the flip-flop inputs. This again causes the flip-flop operating condition to change to one of the six other valid conditions, for example to condition No. 7 if the gated pulse is routed to the 1 input of flip-flop 186 and also the 0 input of flip-flop 188.

The gated pulse from gate 128 as it occurs on one of the matrix output lines 162–172 also gates on one of the frequency burst generators 54–64. It can now be appreciated that any one of nine time slots such as the post-horizontal intervals in each vertical retrace period may have a burst of frequency in it. With equipment as indicated in the drawing, the ninth such interval invariably has a burst of frequency $f_7$ in it, while any of the first six such intervals randomly may or may not have a frequency burst in it and if it does it may be of frequency $f_1, f_2 \ldots$ or $f_6$ according to the setting of the switches in matrix 112. Each of the seventh and eighth time slots is filled with a burst, preferably having different given ones of those six frequencies, only if the respective gate 126, 128 and associated averaging resistors and switches in matrix 196 sense an intolerable or invalid flip-flop operating condition. Since such a condition occurs randomly, gates 126 and 128 are enabled randomly to cause random occurrence of bursts in the seventh and eighth time slots.

Table II above shows only one of the eight non-redundant switching combinations available when deriving the $G_1$, $G_2$, $G_3$ gating signals from a pair of flip-flop outputs. That one, along with the other seven and respectively associated outputs for obtaining the $G_4$ and $G_5$ signals are set forth in Table III below.

TABLE III

| $G_1$ | $G_2$ | $G_3$ | $G_4$ | $G_5$ |
|---|---|---|---|---|
| XY | X'Z | Y'Z' | XY'Z | X'YZ' |
| XY | X'Z' | Y'Z | XY'Z' | X'YZ |
| XY' | X'Z | YZ' | XYZ | X'Y'Z' |
| XY' | X'Z' | YZ | XYZ' | X'Y'Z |
| X'Y | XZ | Y'Z' | X'Y'Z | XYZ' |
| X'Y | XZ' | Y'Z | X'Y'Z' | XYZ |
| X'Y' | XZ | YZ' | X'YZ | XY'Z' |
| X'Y' | XZ' | YZ | X'YZ' | XY'Z |

It may be noted from Table III that the flip-flop outputs making up the $G_4$ and $G_5$ signals under any one of the eight different switch combinations in that table, are complements of each other; for example, the XY'Z outputs are complements of the X'YZ' outputs. It may also be observed that the three flip-flop outputs from which either of the $G_4$ ad $G_5$ signals in Table III is derived, are respectively the same as one of the outputs from which the $G_1$, $G_2$, and $G_3$ signals are derived. That is, when $G_4$ is made up of XY'Z flip-flop outputs as shown in the first instance in Table III, the $G_1$ signal is partially derived from the X output, the $G_3$ signal from the Y' output, and the $G_2$ signal from the Z output.

Since there are eight different non-redundant pair combination (as shown by Table III) by which signals $G_1$, $G_2$, and $G_3$ may be obtained and since those signals may go to gates 22, 24, 26 in any of six ways, a total of 48 such combinations is available by appropriate switch settings in matrix 196.

Of course the switches in matrix 196 may be set in any one of numerous other combined positions than those suggested by Tables I, II, III above, but more efficient and irredundant coding may be obtained by use of the suggested positions. If any given combination of switch settings allows two (or three) of the video gates 22, 24, 26 to be enable at a time, such an intolerable condition can be sensed by the matrix inputs to gates 126, 128 and corrected as above, described relative to the lack of an enabling signal for any of the video gates. In any event, the enabling or effective actuating signals which finally occur on matrix output lines 28, 30, 32 appear thereon mutually exclusively without fail to cause operation of gates 22, 24, 26 in like manner in accordance with a second code which is considerably different than the code represented by the output signals from the order switch matrix 112.

Although the description relative to Tables II and III has mainly been related to the use of all the gating signals G for enabling purposes when respectively at their highest voltage level, it is apparent from those tables that, instead, the lowest voltage level thereof could be employed to enable the respective gates assuming the gates are appropriately designed therefor.

The setting of the different switches in each of matrices 112, 180 and 196 may be accomplished before the beginning of predetermined time periods, such as program intervals, which embrace a multiplicity of vertical trace and retrace intervals. Changing any one or more of the switches in any of the matrices from program to program will change the coding of the system, and is an effective means for preventing pirating of the desirable program signals as is frequent variation of the frequency of oscillators 144–154 in the controllable random signal generator 142.

Of course more or less possible signal combinations can be had by increasing or decreasing the number of flip-flops fed by matrix 180 and by varying the number of random signal sources and counter outputs gated thereby.

Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawing be interpreted as illustrative and not limitative, the scope of the invention being defined in the appended claims.

What is claimed is:

1. In a scrambled television system, a signal translating means responsive to applied actuating signals for effecting in said system any one of a plurality of different operating modes during predetermined intervals spaced by respective mode determining intervals, means for randomly selectively generating at least a part of a plurality of coded signals during each of said mode determining intervals, changeable means for predetermining from amongst a plurality of available orders the existing order, during each of successive time periods each of which includes a multiplicity of said predetermined intervals, in which at least certain of said coded signals when generated during any one of the embraced mode determining intervals are to appear during respective mode determining intervals for representing a first code by their instant order and random existence, and means coupled to said translating means and responsive at least to signals representing said first code for generating for each of said predetermined intervals said actuating signals mutually exclusively in a second code different than the said first code.

2. Apparatus as in claim 1 wherein the last mentioned means further includes means for sensing during any mode determining interval, the existence of any combination of said coded signals from which no effective actuating signal can be generated and automatically changing that combination to another and different combination of coded signals during that same interval.

3. In a scrambled television system, signal translating means responsive to applied actuating signals for effecting in said system any one of a plurality of different operating modes during predetermined intervals spaced by respective mode determining intervals, means for generating, in response to applied coded signals representing a first code, a plurality of individual signals each having a different predetermined identifying characteristic, means for randomly selectively generating at least part of said coded signals during each of said mode determining intervals, changeable means for predetermining from amongst a plurality of available orders the existing order, during each of successive time periods each of which embraces a multiplicity of said predetermined intervals, in which at least certain of said coded signals when generated during any one of the embraced intervals are respectively applied to the said individual signal generating means for causing during respective mode determining intervals a like number of said individual signals which then represent said first code by their instant order and random existence, and means coupled to said translating means and responsive at least to signals representing said first code for generating said actuating signals mutually exclusively for each of said predetermined intervals in a second code different than the said first code.

4. Apparatus as in claim 3 wherein the changeable means includes means for preventing an output from the changeable means of a coded signal even though that signal is received by the changeable means.

5. Apparatus as in claim 3 wherein the input signal generating means includes means for providing a plurality of successive outputs during each of said mode determining intervals and a plurality of random signal generators for respectively selecting at least some of said outputs as said coded signals.

6. Apparatus as in claim 5 wherein each of the random signal generators includes means providing a variable amplitude signal with the amplitudes of all such signals being unrelated one to another.

7. Apparatus as in claim 5 wherein said random signal generators respectively include a plurality of oscillators with at least certain of the oscillators being tuned to different frequencies respectively.

8. Apparatus as in claim 7 wherein each of the oscillators includes means for varying the output frequency thereof from time to time.

9. Apparatus as in claim 7 wherein said random signal generators include means for sampling an instant characteristic of each of said oscillators near the beginning of each mode determining interval, and a plurality of storage output means respectively coupled to said sampling means and changeable from either of their existing storage conditions to another upon receipt of a sampled respective oscillator output which exceeds a given threshold in said characteristic.

10. Apparatus as in claim 5 wherein the successive output providing means includes a counter and means for regularly stepping the counter through one cycle once per mode determining interval.

11. Apparatus as in claim 10 wherein said counter is a beam switching tube of the magnetron family.

12. Apparatus as in claim 5 and further including one other individual signal generating means with a predetermined identifying characteristic different than that for any of the aforementioned such generators, one of all of the said individual signal generating means being energized by the last of said successive outputs during each mode determining interval.

13. Apparatus as in claim 12 wherein said one other individual signal generating means is energized by the last of said successive outputs each time it occurs.

14. Apparatus as in claim 5 and further including means associated with the actuating signal generating means for selecting at least one of said outputs as another of said coded signals.

15. Apparatus as in claim 5 wherein said outputs occur on respective output lines each of which includes gating means respectively coupled for enablement by the random signal generating means, and at least one other output line for carrying another of said outputs and including its own gating means, and wherein said changeable means is a switching matrix having a plurality of inputs respectively coupled to said output lines and its own plurality of output lines respectively coupled to the said individual signal generating means, each input of said matrix being switchable to at least any one of said output lines of the matrix, said matrix output lines being further coupled as input lines to a second switching matrix, and means coupled to the outputs of said second matrix for causing selection at predetermined times of at least said another output via its associated gating means as coupled by the said one other output line to an input of the first mentioned matrix.

16. In a scrambled television system, signal translating means responsive to applied actuating signals for effecting in the system any one of a plurality of different operating modes, means for generating during spaced mode determining intervals a plurality of coded signals; a plurality of storage means, changeable means for applying said coded signals to said storage means for storage therein in a given manner during a predetermined time period embracing a multiplicity of said intervals and in any one of a plurality of other and different manners respectively during other predetermined time periods which respectively embrace others of such intervals, and means coupled to the ouputs of said storage means and to said translating means for selectively mixing the stored signals to produce said actuating signals mutually exclusively.

17. Apparatus as in claim 16 and further including means for generating and delivering to said changeable means during each of said mode determining intervals a given signal which is conditionally applied along with said coded signals by said changeable means to the storage means.

18. Apparatus as in claim 16 wherein the coded signal generating means includes means for producing a plurality of successive output signals during each of said mode determining intervals, means for randomly selecting at least certain of said output signals, and second changeable means for predetermining from amongst a plurality of available order the existing order, during each of successive time periods each of which embraces a multiplicity of said intervals, in which at least certain of said output signals when selected during any one of the embraced said intervals are respectively applied as said coded signals to respective inputs of the first mentioned changeable means.

19. Apparatus as in claim 18 wherein at least one of said output signals is selected during a given mode determining interval as an input to said second changeable means after generation of the said coded signals during that interval by other means for selectively mixing the signals from the storage means.

References Cited

UNITED STATES PATENTS

| | | | |
|---|---|---|---|
| 2,896,193 | 7/1959 | Herrmann | 178—5.1 |
| 3,106,604 | 10/1963 | Shanahan | 178—5.1 |

BENJAMIN A. BORCHELT, Primary Examiner

S. C. BUCZINSKI, Assistant Examiner

U.S. Cl. X.R.

325—32, 122